(12) United States Patent
Haghighat et al.

(10) Patent No.: US 10,365,653 B2
(45) Date of Patent: Jul. 30, 2019

(54) PERSONALIZED AUTONOMOUS VEHICLE RIDE CHARACTERISTICS

(71) Applicant: GM GLOBAL TECHNOLOGY OPERATIONS LLC, Detroit, MI (US)

(72) Inventors: Sohrab Haghighat, Emeryville, CA (US); Gautier Minster, San Francisco, CA (US); Kevin Chu, San Mateo, CA (US); Kyle Vogt, San Francisco, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 179 days.

(21) Appl. No.: 15/620,175

(22) Filed: Jun. 12, 2017

(65) Prior Publication Data
US 2018/0356830 A1 Dec. 13, 2018

(51) Int. Cl.
*B60W 10/04* (2006.01)
*G05D 1/02* (2006.01)
(Continued)

(52) U.S. Cl.
CPC .......... *G05D 1/0221* (2013.01); *B60W 10/04* (2013.01); *B60W 10/10* (2013.01); *B60W 10/18* (2013.01);
(Continued)

(58) Field of Classification Search
CPC ... G05D 1/0221; G05D 1/0223; B60W 10/04; B60W 10/10; B60W 10/18; B60W 10/20;
(Continued)

(56) References Cited

U.S. PATENT DOCUMENTS

| 5,822,707 A | * | 10/1998 | Breed | ..................... | B60R 25/25 701/49 |
| 6,078,854 A | * | 6/2000 | Breed | ..................... | B60N 2/002 701/49 |

(Continued)

FOREIGN PATENT DOCUMENTS

| JP | 01102311 A | * | 4/1989 |
| JP | 2015004602 A | * | 1/2015 |
| JP | 2015120412 A | * | 7/2015 |

OTHER PUBLICATIONS

Kristin P. Bennett, Emilio Parrado-Hernandez, The Interplay of Optimization and Machine Learning Research, Journal of Machine Learning Research 7 (2006) 1265-1281, Jul. 2006.

(Continued)

Primary Examiner — Tuan C To
(74) Attorney, Agent, or Firm — Lorenz & Kopf, LLP

(57) ABSTRACT

Systems and method are provided for controlling a vehicle. In one embodiment, a method includes: obtaining ride preference information associated with a user, identifying a current vehicle pose, determining a motion plan for the vehicle along a route based at least in part on the ride preference information, the current vehicle pose, and vehicle kinematic and dynamic constraints associated with the route, and operating one or more actuators onboard the vehicle in accordance with the motion plan. The user-specific ride preference information influences a rate of vehicle movement resulting from the motion plan.

20 Claims, 5 Drawing Sheets

(51) Int. Cl.
  *B60W 10/10* (2012.01)
  *B60W 10/18* (2012.01)
  *B60W 10/20* (2006.01)
  *B60W 50/10* (2012.01)
  *B60W 50/14* (2012.01)
  *H04L 29/08* (2006.01)
  *H04W 4/40* (2018.01)

(52) U.S. Cl.
  CPC .......... *B60W 10/20* (2013.01); *B60W 50/10* (2013.01); *B60W 50/14* (2013.01); *G05D 1/0223* (2013.01); *H04L 67/306* (2013.01); *B60W 2050/146* (2013.01); *B60W 2510/205* (2013.01); *B60W 2520/105* (2013.01); *B60W 2520/125* (2013.01); *B60W 2520/14* (2013.01); *B60W 2550/10* (2013.01); *B60W 2550/308* (2013.01); *B60W 2550/406* (2013.01); *B60W 2710/205* (2013.01); *B60W 2720/106* (2013.01); *B60W 2720/125* (2013.01); *B60W 2720/14* (2013.01); *B60W 2750/308* (2013.01); *B60W 2750/40* (2013.01); *H04L 67/12* (2013.01); *H04W 4/40* (2018.02)

(58) Field of Classification Search
  CPC .......... B60W 50/10; B60W 50/14; B60W 2050/146; B60W 2510/205; B60W 2520/105; B60W 2520/125; B60W 2520/14; B60W 2550/10; B60W 2550/308; B60W 2550/406; B60W 2710/205; B60W 2720/106; B60W 2720/125; B60W 2720/14; B60W 2750/308; B60W 2750/40; H04L 67/12
  USPC .......................................... 701/23
  See application file for complete search history.

(56) References Cited

U.S. PATENT DOCUMENTS

| | | | |
|---|---|---|---|
| 6,079,982 A * | 6/2000 | Meader | A63F 13/08 434/29 |
| 6,888,447 B2 * | 5/2005 | Hori | G01S 11/12 340/435 |
| 9,754,490 B2 * | 9/2017 | Kentley | G06K 9/00805 |
| 2012/0179342 A1 * | 7/2012 | Noumura | B60W 10/06 701/54 |
| 2016/0089782 A1 * | 3/2016 | Sisbot | B25J 9/163 700/250 |
| 2016/0139598 A1 * | 5/2016 | Ichikawa | B60W 30/09 701/25 |
| 2016/0356603 A1 * | 12/2016 | Hajj | G01C 21/3423 |
| 2016/0378112 A1 * | 12/2016 | Ljubuncic | B60W 30/16 701/45 |
| 2017/0129298 A1 * | 5/2017 | Lu | B60G 17/015 |
| 2017/0186324 A1 * | 6/2017 | Fish | G06Q 10/0833 |
| 2017/0203766 A1 * | 7/2017 | Prokhorov | B60W 40/09 |
| 2017/0267256 A1 * | 9/2017 | Minster | G01C 21/3461 |
| 2018/0173230 A1 * | 6/2018 | Goldman-Shenhar | G08G 1/167 |
| 2018/0194366 A1 * | 7/2018 | Krishnan | B60W 50/10 |

OTHER PUBLICATIONS

John Schulman, Yan Duan, Jonathan Ho, Alex Lee, Ibrahim Awwal, Henry Bradlow, Jia Pan, Sachin Patil, Ken Goldberg, Pieter Abbeel, Motion Planning with Sequential Convex Optimization and Convex Collision Checking, Department of Electrical Engineering and Computer Sciences, University of California at Berkeley, USA, vol. 33, Issue 9, Article first published online Jun. 11, 2014; Issue published: Aug. 1, 2014.

* cited by examiner

PERSONALIZED AUTONOMOUS VEHICLE RIDE CHARACTERISTICS

TECHNICAL FIELD

The present disclosure generally relates to autonomous vehicles, and more particularly relates to systems and methods for personalizing or customizing rider experience in an autonomous vehicle.

BACKGROUND

An autonomous vehicle is a vehicle that is capable of sensing its environment and navigating with little or no user input. An autonomous vehicle senses its environment using sensing devices such as radar, light detection and ranging (lidar) devices, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

With traditional manually-controlled vehicles, the vehicle operator is capable of tailoring the feel of the ride to his or her particular tastes and comfort dynamically and in real-time. However, automated vehicles operating in a fully autonomous mode may lack the ability to respond to conditions in real-time in a manner that accounts for the tastes or preferences of a particular occupant.

Accordingly, it is desirable to provide systems and methods that allow automated vehicles to account for occupant preferences and tailor ride characteristics. Furthermore, other desirable features and characteristics of the present invention will become apparent from the subsequent detailed description and the appended claims, taken in conjunction with the accompanying drawings and the foregoing technical field and background.

SUMMARY

Systems and method are provided for autonomously controlling a vehicle in a personalized manner. In one embodiment, a method includes: obtaining, by a controller onboard the vehicle, ride preference information associated with a user; identifying, by the controller, a current vehicle pose; determining, by the controller, a motion plan for the vehicle along a route based at least in part on the ride preference information, the current vehicle pose, one or more constraints associated with the route or the vehicle; and operating, by the controller, one or more actuators onboard the vehicle in accordance with the motion plan, wherein the ride preference information influences a rate of vehicle movement resulting from the motion plan.

In another embodiment, an autonomous vehicle includes: at least one sensor that provides sensor data; one or more actuators onboard the vehicle; a communication system onboard the vehicle to receive ride preference information associated with a user; and a controller that, by a processor and based on the sensor data and the ride preference information, identifies a current vehicle pose, determines object prediction data for an object based at least in part on the sensor data, determines a motion plan for the vehicle along a route based at least in part on the ride preference information, the current vehicle pose, the object prediction data and one or more constraints associated with the route or the vehicle, and autonomously operates the one or more actuators onboard the vehicle in accordance with the motion plan, wherein the ride preference information influences a rate of vehicle movement resulting from the motion plan.

In another embodiment, an autonomous vehicle system includes: a graphical user interface display to receive user input indicative of ride preference information; one or more actuators onboard a vehicle; and a controller onboard the vehicle and coupled to the one or more actuators to obtain the ride preference information, determine a motion plan for the vehicle along a route based at least in part on the ride preference information, a current vehicle pose, and one or more constraints associated with the route or the vehicle, and operate the one or more actuators onboard the vehicle in accordance with the motion plan, wherein the ride preference information influences a rate of vehicle movement resulting from the motion plan.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
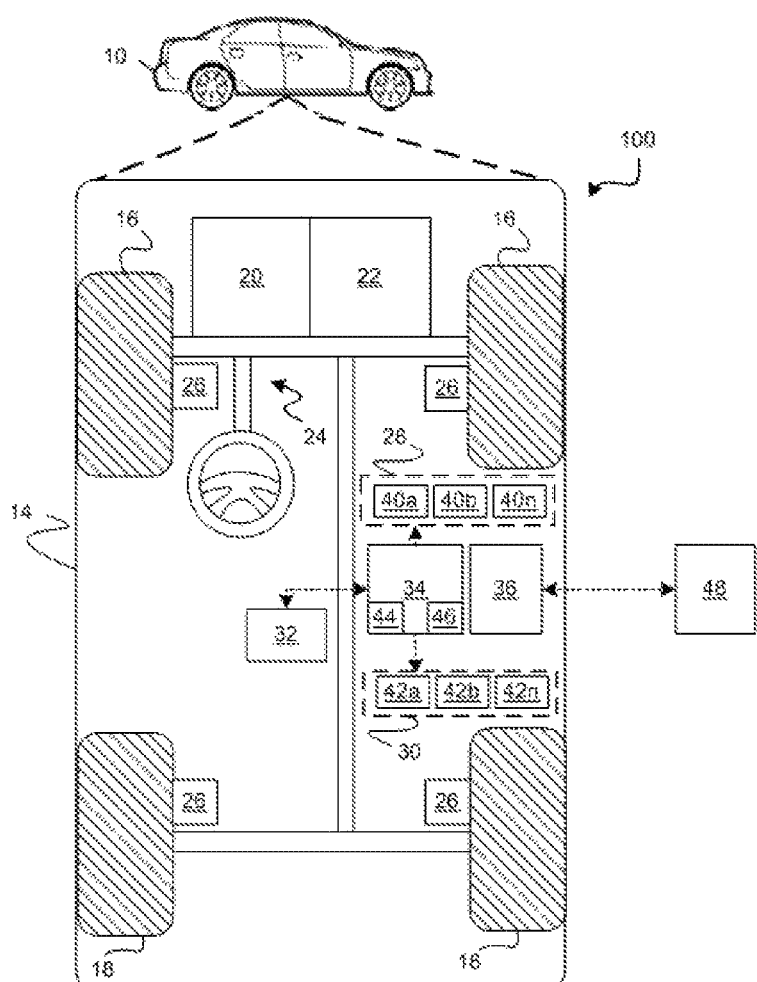
FIG. 1 is a functional block diagram illustrating an autonomous vehicle having a ride control system, in accordance with various embodiments.

With reference to FIG. 1, a ride control system shown generally at 100 is associated with a vehicle 10 in accordance with various embodiments. In general, the ride control system 100 determines a motion plan for autonomously operating the vehicle 10 along a route in accordance with ride preference information associated with a vehicle occupant. In this regard, the ride preference information influences the rate at which the vehicle 10 moves laterally and/or longitudinally while traversing the route and avoiding obstacles, which, in turn influences the ride experienced by the occupant, as described in greater detail below primarily in the context of FIGS. 4-5.

As depicted in FIG. 1, the vehicle 10 generally includes a chassis, a body 14, front wheels 16, and rear wheels 18. The body 14 is arranged on the chassis and substantially encloses components of the vehicle 10. The body 14 and the chassis may jointly form a frame. The wheels 16-18 are each rotationally coupled to the chassis near a respective corner of the body 14.

In various embodiments, the vehicle 10 is an autonomous vehicle and the ride control system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the vehicle wheels 16-18. The brake system 26 may, in various embodiments, include friction brakes, brake by wire, a regenerative braking system such as an electric machine, and/or other appropriate braking systems. The steering system 24 influences a position of the of the vehicle wheels 16-18. While depicted as including a steering wheel for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n can include, but are not limited to, radars, lidars, global positioning systems, optical cameras, thermal cameras, ultrasonic sensors, and/or other sensors. The actuator system 30 includes one or more actuator devices 42a-42n that control one or more vehicle features such as, but not limited to, the propulsion system 20, the transmission system 22, the steering system 24, and the brake system 26. In various embodiments, the vehicle features can further include interior and/or exterior vehicle features such as, but are not limited to, doors, a trunk, and cabin features such as air, music, lighting, etc. (not numbered).

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are embodied in the ride control system 100 and, when executed by the processor 44, cause the processor 44 to calculate, determine, or otherwise generate a motion plan for operating the vehicle 10 in accordance with ride preference information. For example, the instructions may cause the processor 44 to obtain, either from onboard memory 32 or another entity 48, ride preference information for a current vehicle occupant and determine a solution for how to control and traverse the vehicle 10 along a route in a manner that accounts for the ride preference information. Using various longitudinal and lateral constraints associated with the route (e.g., speed limits or other traffic restrictions, lane boundaries or other lane restrictions, and the like), the processor 44 calculates or otherwise determines speed, acceleration, and steering plans for operating the vehicle 10 along the route in a manner that minimizes a cost (e.g., travel time, fuel consumption, or the like) associated with traversing the route in accordance with the ride preference information.

As described in greater detail below in the context of FIGS. 4-5, the ride preference information may limit or otherwise constrain the speed or velocity of the vehicle 10 longitudinally (e.g., in the general direction of travel along the route), the acceleration or deceleration of the vehicle 10 longitudinally, the longitudinal jerk of the vehicle 10 (e.g., rate of change of the acceleration or deceleration of the vehicle 10 longitudinally), the acceleration or deceleration of the vehicle 10 laterally, and/or the rate of change of the acceleration or deceleration of the vehicle 10 laterally. Additionally, the ride preference information may limit or otherwise constrain the distance or buffer maintained between the vehicle 10 and other objects or obstacles, while also indicating which cost variable or combination thereof (e.g., time, route distance, fuel consumption, or the like) is to be optimized by the solver. Thus, the resulting longitudinal and lateral motion plans for the vehicle 10 result in movement of the vehicle that generally complies with or otherwise satisfies the occupant's ride characteristic preferences. For example, the longitudinal plan does not violate the maximum speed or acceleration that is acceptable to the occupant while also maintaining a longitudinal separation distance between the vehicle 10 and other vehicles or obstacles that satisfies the occupant's desired minimum following distance. In one or more embodiments, the ride preference information is constrained by the applicable traffic laws for the geographic region in which the vehicle 10 is currently located, thereby ensuring the vehicle 10 does not autonomously attempt to violate the law in order to comply with the ride preference information.

In one or more embodiments, a graphical user interface (GUI) display is provided that includes GUI elements that allow a user to adjust or otherwise modify his or her ride preference information. The GUI display may be generated by the processor 44 on a display device onboard the vehicle or on or by another entity 48, such as, for example, a cell phone, smartphone, or other mobile device communicatively coupled to the processor 44 or controller 34. A user may interact with the GUI display and the GUI elements presented thereon to adjust or otherwise modify ride preferences from initial or default settings and then save or otherwise maintain the ride preference information associated with the user. Thereafter, the processor 44 retrieves that ride preference information when the user is in the vehicle 10 and tailors the ride characteristics accordingly as described herein. At the completion of the route or during the route, the GUI display may be similarly presented or otherwise provided to the user to thereby allow the user to dynamically adjust, update, or otherwise modify his or her ride preference information substantially in real-time to achieve the desired ride characteristics. In other embodiments, a GUI display may be presented to obtain ride feedback information from the user, which, in turn may be utilized by the processor 44 or other entity 48 to automatically adjust the ride preference information associated with the user based on the ride feedback information from a preceding ride. Thus, the ride preference information may be adapted or otherwise tailored to suit each individual user's taste or preference.

Figure 2:
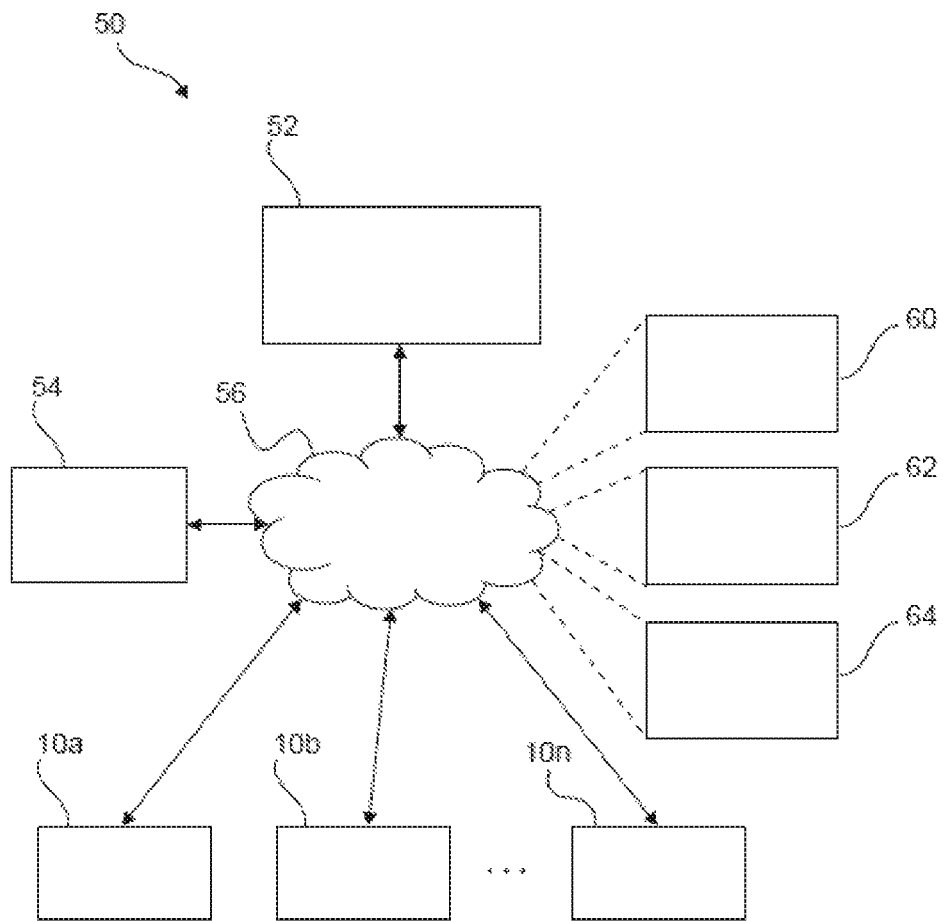
FIG. 2 is a functional block diagram illustrating a transportation system having one or more autonomous vehicles of FIG. 1, in accordance with various embodiments.

Still referring to FIG. 1, in exemplary embodiments, the communication system 36 is configured to wirelessly communicate information to and from other entities 48, such as but not limited to, other vehicles ("V2V" communication,) infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more instances of autonomous vehicles 10a-10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, behavioral patterns, and other pertinent subscriber information, such as the ride preference information described herein.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
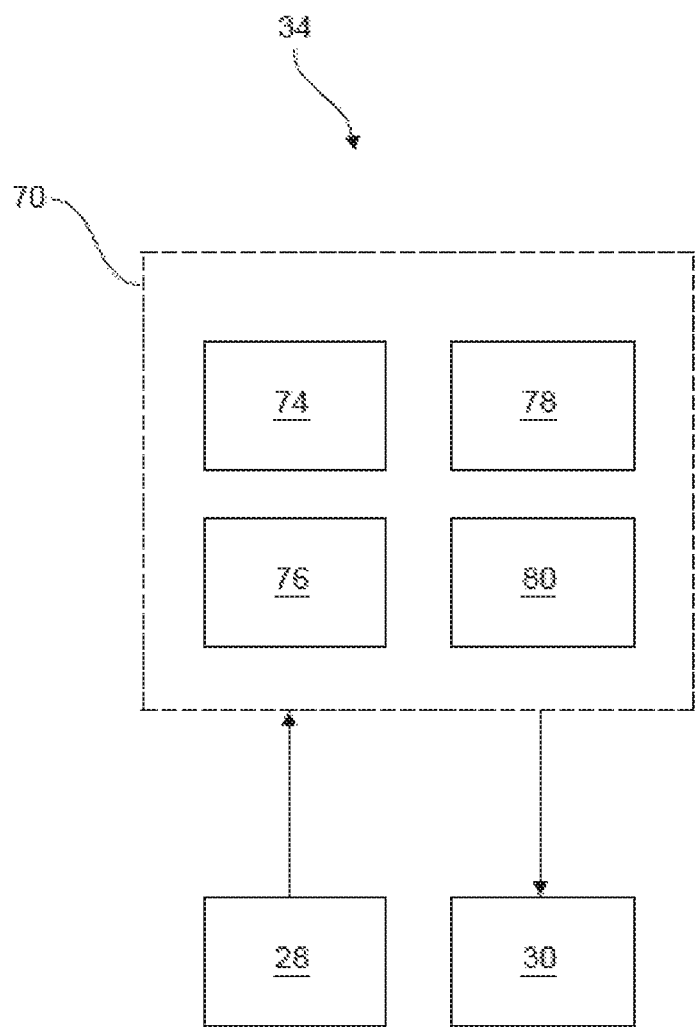
FIG. 3 is a schematic block diagram of an automated driving system (ADS) for a vehicle in accordance with one or more exemplary embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10, for example, to automatically control various actuators 30 onboard the vehicle 10 to thereby control vehicle acceleration, steering, and braking, respectively, without human intervention.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path. In one or more exemplary embodiments, the guidance system 78 determines a vehicle path to be followed to maintain the vehicle on a desired route while obeying traffic laws and avoiding any detected obstacles, while the vehicle control system 80 generates one or more actuator commands for achieving the commanded path, including, but not limited to, a steering command, a shift command, a throttle command, and a brake command. By way of example, as illustrated in FIG. 1, the steering control may control a steering system 24, the shifter control may control a transmission system 22, the throttle control may control a propulsion system 20, and the brake control may control wheel brake system 26.

In one or more embodiments, the guidance system 78 provides an output that includes a lateral path command for controlling the steering or lateral position of the vehicle along a route and a longitudinal path command for controlling the longitudinal position, the velocity and/or the acceleration of the vehicle along the route in concert with the lateral path command. In this regard, the lateral and longitudinal path commands incorporate or otherwise account for ride preferences associated with one or more vehicle occupants to tailor the respective rates of lateral and longitudinal movement to the preferences of the vehicle occupant(s). For example, for an occupant preferring a more conservative ride, the longitudinal path command may limit the planned velocities and accelerations or increase following distances behind other vehicles or obstacles. Conversely, for an occupant preferring a less conservative ride, the longitudinal path command may utilize less restrictive velocities and accelerations or reduce the following distances behind other vehicles or obstacles. Similarly, for an occupant preferring a more conservative ride, the lateral path command may limit the rates of lateral movement (e.g., by limiting the planned rate of change or acceleration of the vehicle steering angle), while for an occupant preferring a less conservative ride, the lateral path command may utilize greater rates of lateral movement.

Figure 4:
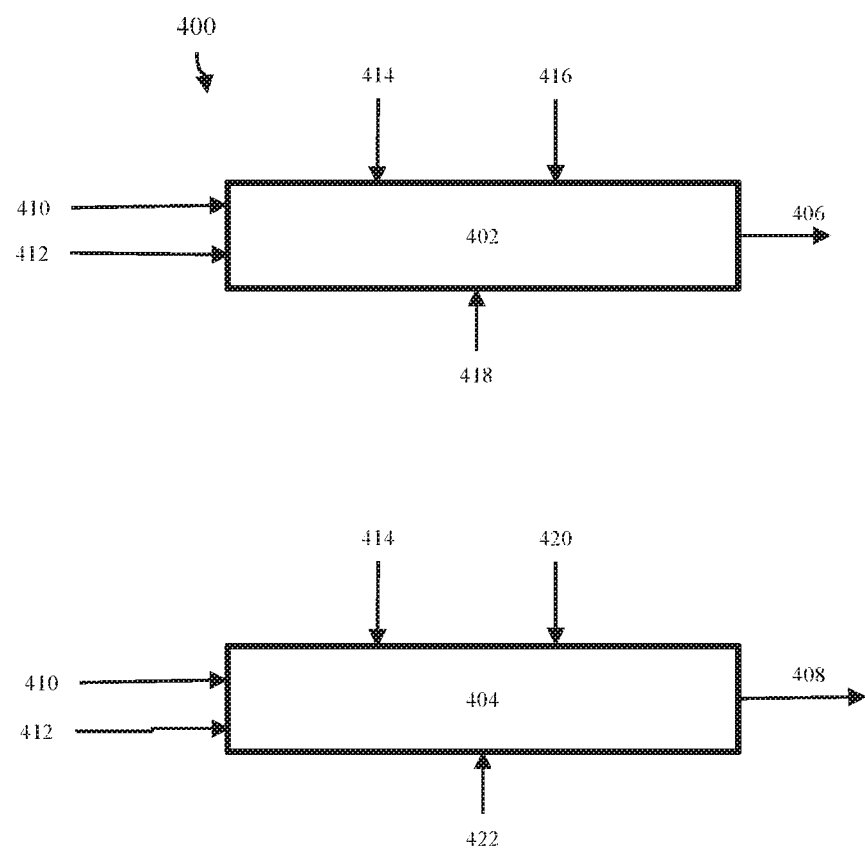
FIG. 4 is a block diagram of a motion planning module for a vehicle in accordance with one or more exemplary embodiments.

FIG. 4 depicts a motion planning module 400 suitable for use with a vehicle to generate a motion plan for controlling the vehicle as it traverses along a route, such as, for example, as part of the guidance system 78 in an ADS 70 implemented by a control module (e.g., controller 34 or processor 44) in the vehicle 10 of FIG. 1. The motion planning module 400 includes a longitudinal solver module 402 that generates a longitudinal motion plan output 406 for controlling the movement of the vehicle along the route in the general direction of travel, for example, by causing the vehicle to accelerate or decelerate at one or more locations in the future along the route. The motion planning module 400 also includes a lateral solver module 404 that generates a lateral motion plan output 408 for controlling the lateral movement of the vehicle along the route to alter the general direction of travel, for example, by steering the vehicle at one or more locations in the future along the route. The longitudinal and lateral plan outputs 406, 408 correspond to the commanded (or planned) path output provided to the vehicle control system 80 for controlling the vehicle actuators 30 to achieve movement of the vehicle 10 along the route that corresponds to the longitudinal and lateral plans 406, 408.

As described above, in exemplary embodiments, the solver modules 402, 404 optimize a map of car vehicle trajectories. In this regard, the longitudinal solver module 402 optimizes the vehicle speed (or velocity) in the direction of travel, the vehicle acceleration in the direction of travel, and the derivative of the vehicle acceleration in the direction of travel, alternatively referred to herein as the longitudinal jerk of the vehicle. The lateral solver module 404 optimizes one or more of the steering angle, the rate of change of the steering angle, and the acceleration or second derivative of the steering angle, alternatively referred to herein as the lateral jerk of the vehicle. In this regard, the steering angle can be related to the curvature of the path or route, and any one of the steering angle, the rate of change of the steering angle, and the acceleration or second derivative of the steering angle can be optimized by the lateral solver module 404, either individually or in combination.

In exemplary embodiments, the longitudinal solver module 402 receives or otherwise obtains the current or instantaneous pose 410 of the vehicle, which includes the current position or location of the vehicle, the current orientation of the vehicle, the current speed or velocity of the vehicle, and the current acceleration of the vehicle. Using the current position or location of the vehicle, the longitudinal solver module 402 also retrieves or otherwise obtains route information 412 which includes information about the route the vehicle is traveling along given the current pose 410 and plus some additional buffer distance or time period (e.g., 12 seconds into the future), such as, for example, the current and future road grade or pitch, the current and future road curvature, current and future lane information (e.g., lane types, boundaries, and other constraints or restrictions), as well as other constraints or restrictions associated with the roadway (e.g., minimum and maximum speed limits, height or weight restrictions, and the like), including those described above or elsewhere within. The route information 412 may be obtained from, for example, an onboard data storage element 32, an online database, or other entity. In one or more embodiments, the lateral route information 412 may include the planned lateral path command 408 output by the lateral solver module 404, where the longitudinal and lateral solver modules 402, 404 iteratively derive an optimal travel plan along the route as described below.

The longitudinal solver module 402 also receives or otherwise obtains the current obstacle data 414 relevant to the route and current pose of the vehicle, which may include, for example, the location or position, size, orientation or heading, speed, acceleration, and other characteristics of objects or obstacles in a vicinity of the vehicle or the future route. The longitudinal solver module 402 also receives or otherwise obtains longitudinal vehicle constraint data 416 which characterizes or otherwise defines the kinematic or physical capabilities of the vehicle for longitudinal movement, such as, for example, the maximum acceleration and the maximum longitudinal jerk, the maximum deceleration, and the like. The longitudinal vehicle constraint data 416 may be specific to each particular vehicle and may be obtained from an onboard data storage element 32 or from a networked database or other entity 48, 52, 54. In some embodiments, the longitudinal vehicle constraint data 416 may be calculated or otherwise determined dynamically or substantially in real-time based on the current mass of the vehicle, the current amount of fuel onboard the vehicle, historical or recent performance of the vehicle, and/or potentially other factors. In one or more embodiments, the longitudinal vehicle constraint data 416 is calculated or determined in relation to the lateral path, the lateral vehicle constraint data 420, and/or determinations made by the lateral solver module 404. For example, the maximum longitudinal speed may be constrained at a particular location by the path curvature and the maximum lateral acceleration by calculating the maximum longitudinal speed as a function of the path curvature and the maximum lateral acceleration (which itself be could be constrained by rider preferences or vehicle dynamics). In this regard, at locations where the degree of path curvature is relatively high (e.g., sharp turns), the maximum longitudinal speed may be limited accordingly to maintain comfortable or achievable lateral acceleration along the curve.

The longitudinal solver module 402 also receives or otherwise obtains longitudinal ride preference information 418 associated with a particular user or vehicle occupant from onboard memory 32 or another entity 48, 52, 54 communicatively coupled to a vehicle processing module. In this regard, the longitudinal ride preference information 418 includes user-specific values or settings for the speed or velocity of the vehicle (e.g., a maximum vehicle speed or some other speed target based on the speed limit), the acceleration of the vehicle (e.g, a maximum acceleration), the deceleration of the vehicle (e.g., a maximum deceleration), and the jerk of the vehicle (e.g., maximum jerk in the forward and reverse directions). The longitudinal ride preference information 418 may include user-specific following distances or buffers between objects or obstacles, such as, for example, a minimum and/or maximum following distance for other vehicles, a minimum buffer or separation distance between objects or obstacles, and the like.

Using the various inputs 410, 412, 414, 416, 418 to the longitudinal solver module 402, the longitudinal solver module 402 calculates or otherwise determines a longitudinal plan (e.g., planned speed, acceleration and jerk values in the future as a function of time) for traveling along the route within some prediction horizon (e.g., 12 seconds) by optimizing some longitudinal cost variable or combination thereof (e.g., minimizing travel time, minimizing fuel consumption, minimizing jerk, or the like) by varying the speed or velocity of the vehicle from the current pose 410 in a manner that ensures the vehicle complies with the longitudinal ride preference information 418 to the extent possible while also complying with lane boundaries or other route constraints and avoiding collisions with objects or obstacles. In this regard, in many conditions, the resulting longitudinal plan 406 generated by the longitudinal solver module 402 does not violate the maximum vehicle speed, the maximum vehicle acceleration, the maximum deceleration, and the maximum longitudinal jerk settings associated with the user, while also adhering to the following distances or buffers associated with the user. That said, in some scenarios, violating one or more longitudinal ride preference settings 418 may be necessary to avoid collisions, comply with traffic signals, or the like, in which case, the longitudinal solver module 402 may attempt to maintain compliance of as many of the user-specific longitudinal ride preference settings 418 as possible. Thus, the resulting longitudinal plan 406 generally complies with the user's longitudinal ride preference information 418, but does not necessarily do so strictly.

Still referring to FIG. 4, in a similar manner, the lateral solver module 404 receives or otherwise obtains the current vehicle pose 410 and the relevant route information 412 and obstacle data 414 for determining a lateral travel plan solution within the prediction horizon. The lateral solver module 404 also receives or otherwise obtains lateral vehicle constraint data 420 which characterizes or otherwise defines the kinematic or physical capabilities of the vehicle for lateral movement, such as, for example, the maximum steering angle or range of steering angles, the minimum turning radius, the maximum rate of change for the steering angle, and the like. The lateral vehicle constraint data 420 may also be specific to each particular vehicle and may be obtained from an onboard data storage element 32 or from a networked database or other entity 48, 52, 54.

The lateral solver module 404 also receives or otherwise obtains the user-specific lateral ride preference information 422 which includes, for example, user-specific values or settings for the steering rate (e.g., a maximum rate of change for the steering angle, a maximum acceleration of the steering angle, and/or the like), the lateral jerk, and the like. The lateral ride preference information 422 may include also user-specific distances or buffers, such as, for example, a minimum and/or maximum distance from lane boundaries, a minimum lateral buffer or lateral separation distance between objects or obstacles, and the like, and potentially other user-specific lane preferences (e.g., a preferred lane of travel).

Using the various inputs 410, 412, 414, 420, 422 to the lateral solver module 404, the lateral solver module 404 calculates or otherwise determines a lateral plan for traveling along the route at future locations within some prediction horizon (e.g., 50 meters) by optimizing some lateral cost variable or combination thereof (e.g., minimizing deviation from the center of the roadway, minimizing the curvature of the path, minimizing lateral jerk, or the like) by varying the steering angle or vehicle wheel angle in a manner that ensures the vehicle complies with the lateral ride preference information 422 to the extent possible while also complying with lane boundaries or other route constraints and avoiding collisions with objects or obstacles.

In one or more exemplary embodiments, the lateral solver module 404 utilizes the longitudinal travel plan 406 from the longitudinal solver module 402 along with the route information 412 and obstacle data 414 to determine how to steer the vehicle from the current pose 410 within the prediction horizon while attempting to comply with the lateral ride preference information 422.

For example, in some embodiments, the longitudinal solver modules 402, 404 iteratively derive an optimal solution for controlling the vehicle along a future portion of route within a prediction horizon. For example, the lateral solver module 404 may generate an initial lateral travel plan 408 for a lateral prediction horizon based on the current pose 410, the route information 412 and obstacle data 414, the lateral vehicle constraints 420, and the lateral ride preference information 422. Thereafter, the longitudinal solver module 402 may generate an initial longitudinal travel plan 406 for a longitudinal prediction horizon that is optimized for a cost variable based on the current pose 410 (e.g., the current heading and steering angle) and using the initial lateral travel plan 408 for the steering or orientation of the vehicle along the route. Thereafter, lateral solver module 404 may generate an updated lateral travel plan 408 using the initial longitudinal travel plan 406 to inform the vehicle position along the route, and the longitudinal solver module 402 may similarly generate an updated longitudinal travel plan 406 using the updated lateral travel plan 406, and so on, until an optimal combination of longitudinal and lateral travel plans 406, 408 is achieved that maximizes compliance with the user's ride preference information 418, 422. In this regard, the resulting longitudinal and lateral travel plans 406, 408 that are ultimately output by the motion planning module 400 comply with as many of the user's ride preferences 418, 422 as possible while optimizing the cost variable and avoiding collisions by varying one or more of the vehicle's velocity, acceleration/deceleration (longitudinally and/or laterally), jerk (longitudinally and/or laterally), steering angle, and steering angle rate of change.

The longitudinal travel plan 406 output by the motion planning module 400 includes a sequence of planned velocity and acceleration commands with respect to time for operating the vehicle within the longitudinal prediction horizon (e.g., a velocity plan for the next 12 seconds), and similarly, the lateral travel plan 408 output by the motion planning module 400 includes a sequence of planned steering angles and steering rates with respect to distance or position for steering the vehicle within the lateral prediction horizon while operating in accordance with the longitudinal travel plan 406 (e.g., a steering plan for the next 50 meters). The longitudinal and lateral plan outputs 406, 408 are provided to the vehicle control system 80, which may utilize vehicle localization information and employs its own control schemes to generate control outputs that regulate the vehicle localization information to the longitudinal and lateral plans 406, 408 by varying velocity and steering commands provided to the actuators 30, thereby varying the speed and steering of the vehicle 10 to emulate or otherwise effectuate the longitudinal and lateral plans 406, 408.

Figure 5:
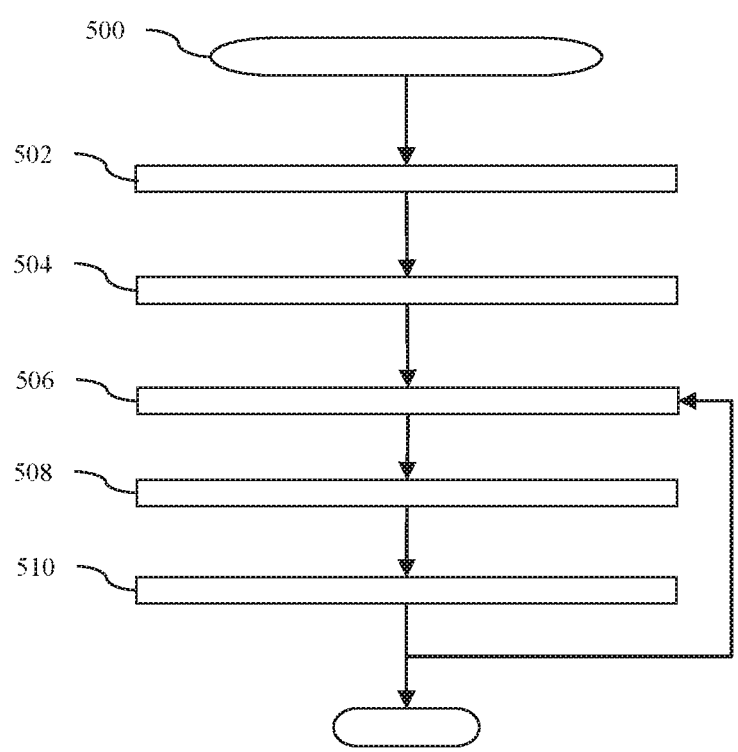
FIG. 5 is a flowchart illustrating a ride characteristic control process for controlling the autonomous vehicle of FIG. 1, in accordance with one or more exemplary embodiments.

Referring now to FIG. 5, and with continued reference to FIGS. 1-4, a dataflow diagram illustrates various embodiments of a ride characteristic control process 500 which may be embedded within a controller 34 in the ride control system 100 of FIG. 1 supporting the ADS 70 and motion planning module 400 of FIG. 4 in accordance with the present disclosure. As can be appreciated in light of the disclosure, the order of operation within the method is not limited to the sequential execution as illustrated in FIG. 5, but may be performed in one or more varying orders as applicable and in accordance with the present disclosure. In various embodiments, the ride characteristic control process 500 can be scheduled to run based on one or more predetermined events, and/or can run continuously during operation of the autonomous vehicle 10.

The illustrated ride characteristic control process 500 initializes by generating or otherwise providing one or more GUI displays adapted to allow a user to input or otherwise provide his or her preferences for ride characteristics at 502. For example, as described above, the GUI display may be generated by a vehicle control module 34, 44 on a display device onboard the vehicle 10, or alternatively, on the display associated with another device 48, 52, 54 accessible to the user. For example, the GUI display may be generated by an application on a user device 48, 54 that is communicatively coupled to the vehicle controller 34 and/or the remote transportation system 52. The GUI display may include GUI elements, such as, for example, slider bars, text boxes, list boxes, and the like. The GUI display may allow for a user to input or otherwise provide specific values for one or more ride preference settings. Alternatively, a user may input or otherwise provide information that subjectively characterizes his or her driving or riding preferences, which, in turn, may be automatically translated into corresponding ride preference setting values. For example, a slider bar may be provided that allows the user to move a slider within a range of positions from a conservative ride setting to an aggressive ride setting. Based on the position of the slider bar within the slider range, the default setting values for the ride preference settings may be scaled up or down to achieve more aggressive or more conservative ride preferences.

For example, more aggressive ride settings may result in higher maximum values for vehicle speed, acceleration, lateral and longitudinal jerk, steering angle rate, and the like, for example, by multiplying default values by a scaling factor that is greater than one and determined based on a position of the slider bar with respect to the slider width. More aggressive ride settings may result in lower minimum values for following distance, obstacle buffers or separation distances, separation distances from a lane boundary or roadway edge, and the like, for example, by multiplying default values by a scaling factor having a fractional value between zero and one that is determined based on a position of the slider bar with respect to the slider range. Aggressive ride settings may also result in different lane preferences (e.g., the left lane), or a different cost variable to be optimized by the solvers (e.g., minimize travel time). Conversely, more conservative ride settings may result in lower maximum values for vehicle speed, acceleration, lateral and longitudinal jerk, steering angle rate, and the like, for example, by multiplying default values by a scaling factor having a fractional value between zero and one based on the slider position relative to the conservative end of the slider range. More conservative ride settings may also result in higher minimum values for following distance, obstacle buffers or separation distances, separation distances from a lane boundary or roadway edge, and the like, for example, by multiplying default values by a scaling factor having a value greater than one based on the position of the slider bar. Conservative ride settings may also result in different lane preferences (e.g., the right lane), or a different cost variable to be optimized by the solvers (e.g., minimize fuel consumption).

After the user's ride preferences are defined, the ride characteristic control process 500 continues by storing or otherwise maintaining the user's ride preference information in association with the user at 504. In this regard, a vehicle control module 34, 44 may store the ride preference information in a data storage 32 onboard the vehicle 10, or alternatively, the ride preference information may be stored on a mobile device 48, 54 associated with the user or on or by a remote device 52 in association with the user.

The illustrated process 500 continues by autonomously operating a vehicle in accordance with the user's ride preference information at 506. For example, as described above, a user may create a ride request via the user device 54 which results in the remote transportation system 52 dispatching the vehicle 10 to the user's location. In some embodiments, the remote transportation system 52 also utilizes identification information or other subscriber information associated with the user to locate and retrieve the stored ride preference information associated with that user and then transmits or otherwise transfers the user's ride preference information to the vehicle control module 34, 44 for subsequent utilization by the ADS 70 and motion planning module 400. In yet other embodiments, when the user's ride preference information is stored on a user device 48, 54, the user device 48, 54 may establish communications with the vehicle 10 when in vicinity of the user device 48, 54 (e.g., via a wireless communications session) and then transmits or otherwise transfers the user's ride preference information from the user device 48, 54 to the vehicle control module 34, 44. In yet other embodiments, the user's ride preference information may already reside onboard the vehicle 10 in storage 32. Once the user's ride preference information is obtained, the controller 34 and/or the processor 44 configures the solver modules 402, 404 to utilize the user's ride preference information to generate travel plans 406, 408 to autonomously operate and control travel of the vehicle 10 from the initially dispatched location to the desired destination location in accordance with the ride preference information.

In exemplary embodiments, the ride characteristic control process 500 generates or otherwise provides one or more GUI displays adapted to allow a user to input or otherwise provide feedback regarding the ride quality resulting from the autonomous operation of the vehicle at 508 and adjusts or otherwise updates the user's ride preference information in response to the ride feedback at 510. For example, either during autonomous operation of the vehicle 10 or upon reaching the desired destination, a GUI display may be generated on a display device onboard the vehicle 10 or on a user device 48, 54 that allows the user to provide feedback regarding the ride quality or otherwise adjust his or her ride preferences. In this regard, the GUI display may be the same as or different from the GUI display generated at 502. In one embodiment, the GUI display prompts the user to provide feedback as to whether or not the user perceived the ride to be too aggressive or too conservative. Based on the response received from the user, the ride characteristic control process 500 adjusts the user's ride preference information to be more aggressive (e.g., when the ride is too conservative) or more conservative (e.g., when the ride is too aggressive), for example, by scaling values up or down accordingly as described above. In one or more exemplary embodiments, the loop defined by 506, 508 and 510 repeats indefinitely to dynamically adjust or otherwise adapt a user's ride preferences to fine tune the user's ride preference settings values to suit the tastes of that particular user.

In one or more exemplary embodiments, the ride characteristic control process 500 stores or otherwise maintains the updated ride preference information in lieu of the preceding ride preference information in a similar manner as described above at 504. In yet other embodiments, the ride characteristic control process 500 may store or otherwise maintain one or more historical ride preference settings for the user to calculate or otherwise determine updated ride preference settings for the user as a weighted sum of preceding values for the respective ride characteristics. In this regard, it should be noted that in practice, there are numerous different ways that the ride characteristic control process 500 can dynamically adjust a user's ride preference information to adaptively respond to the user's ride quality feedback and arrive at ride preference settings that are uniquely tailored for that particular user.

It will be appreciated that the subject matter described herein allows for autonomous vehicle operation to be tailored and achieve a ride quality in accordance with each individual user's ride preferences. Thus, the user experience is improved when riding in an autonomous vehicle. It should also be noted that in practice, the subject matter may be described herein may also account for multiple different users in the same vehicle. For example, in various embodiments, when there are multiple user's in a vehicle, the ride preference information may be obtained for each of the users and averaged or otherwise combined to achieve cumulative ride preference settings that account for the relative preferences of each of the users. Feedback regarding the cumulative ride preference settings may also be utilized to adjust or otherwise alter individual user ride preference settings in a similar manner as described above. For example, in various embodiments, a GUI display may be presented or provided to an individual user that prompts the user for whether or not the user wants to modify or update their ride preferences, and if so, the individual user ride preference settings may be automatically updated according to the feedback (e.g., by weighting the user's previous preferences with the cumulative preferences or isolating the individual user's feedback) or a GUI display (or sequence thereof) may be provided that allows the individual to further refine his or her ride preferences. In this regard, there are numerous different ways in which the ride preferences may be dynamically or adaptively updated, and the subject matter described herein is not intended to be limited to any particular manner or technique.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of autonomously controlling a vehicle in a personalized manner, the method comprising:

obtaining, by a controller onboard the vehicle, ride preference information associated with a user, the ride preference information comprising a user-specific value for a maximum rate of change for an acceleration of the vehicle;

identifying, by the controller, a current vehicle pose;

determining, by the controller, a motion plan for the vehicle along a route based at least in part on the ride preference information, the current vehicle pose, and constraints associated with the route, wherein the motion plan comprises a solution for traversing along the route from the current vehicle pose in a manner that satisfies the constraints and the user-specific value for the maximum rate of change for the acceleration of the vehicle, the user-specific value for the maximum rate of change for the acceleration of the vehicle influencing a rate of vehicle movement resulting from the motion plan; and operating, by the controller, one or more actuators onboard the vehicle in accordance with the motion plan.

2. The method of claim 1, the ride preference information including a longitudinal constraint, wherein the longitudinal constraint influences the rate of vehicle movement longitudinally.

3. The method of claim 1, the ride preference information including a lateral constraint, wherein the lateral constraint influences the rate of vehicle movement laterally.

4. The method of claim 1, further comprising obtaining, by the controller, obstacle data for an object, wherein:
the ride preference information includes a separation distance; and
the separation distance influences the rate of vehicle movement relative to the object.

5. The method of claim 1, the ride preference information comprising a plurality of constraints, wherein determining the motion plan comprises determining a solution for traversing along the route from the current vehicle pose that maximizes compliance with the plurality of constraints.

6. The method of claim 5, wherein determining the solution comprises optimizing a cost function associated with traversing along the route from the current vehicle pose in a manner that maximizes compliance with the plurality of constraints.

7. The method of claim 1, further comprising:
receiving user feedback after operating the one or more actuators in accordance with the motion plan; and
updating the ride preference information based on the user feedback.

8. The method of claim 1, wherein obtaining the ride preference information comprises receiving the ride preference information from a user device in a vicinity of the vehicle.

9. The method of claim 1, wherein obtaining the ride preference information comprises receiving the ride preference information associated with the user from a remote device via a network.

10. The method of claim 1, wherein obtaining the ride preference information comprises:
generating a graphical user interface display including one or more graphical user interface elements; and
receiving the ride preference information input via the one or more graphical user interface elements.

11. A computer-readable medium having computer-executable instructions stored thereon that, when executed by a processor of the controller onboard the vehicle, cause the processor to perform the method of claim 1.

12. An autonomous vehicle, comprising:
at least one sensor that provides sensor data;
one or more actuators onboard the vehicle;
a communication system onboard the vehicle to receive ride preference information associated with a user, the ride preference information comprising a user-specific value for a maximum rate of change for an acceleration of the vehicle; and
a controller that, by a processor and based on the sensor data and the ride preference information, identifies a current vehicle pose, determines object prediction data for an object based at least in part on the sensor data, determines a motion plan for the vehicle along a route based at least in part on the ride preference information, the current vehicle pose, the object prediction data and constraints associated with the route, and autonomously operates the one or more actuators onboard the vehicle in accordance with the motion plan, wherein:
the motion plan comprises a solution for traversing along the route from the current vehicle pose in a manner that satisfies the constraints and the user-specific value for the maximum rate of change for the acceleration of the vehicle; and
the user-specific value for the maximum rate of change for the acceleration of the vehicle influences a rate of vehicle movement resulting from the motion plan.

13. The vehicle of claim 12, the ride preference information comprising a plurality of constraints, wherein the motion plan comprises a solution for traversing along the route from the current vehicle pose that maximizes compliance with the plurality of constraints.

14. The vehicle of claim 13, wherein the plurality of constraints includes one or more of a maximum speed, a maximum acceleration, or a maximum longitudinal jerk influencing the rate of vehicle movement longitudinally.

15. The vehicle of claim 13, wherein the plurality of constraints includes at least one of a maximum steering rate, a maximum steering rate acceleration, a maximum lateral acceleration, and a maximum lateral jerk influencing the rate of vehicle movement laterally.

16. The vehicle of claim 13, wherein the plurality of constraints includes at least one of a minimum lateral separation distance and a minimum following distance, wherein the at least one of the minimum lateral separation distance and the minimum following distance influences the rate of vehicle movement relative to the object.

17. The vehicle of claim 12, wherein the controller is configured to receive user feedback via the communications system after operating the one or more actuators in accordance with the motion plan and update the ride preference information based on the user feedback.

18. An autonomous vehicle system comprising:
a graphical user interface display to receive user input indicative of ride preference information, the ride preference information comprising a user-specific value for a maximum rate of change for an acceleration of the vehicle;
one or more actuators onboard a vehicle; and
a controller onboard the vehicle and coupled to the one or more actuators to obtain the ride preference information, determine a motion plan for the vehicle along a route based at least in part on the ride preference information, a current vehicle pose, and constraints associated with the route, and operate the one or more actuators onboard the vehicle in accordance with the motion plan, wherein:
the motion plan comprises a solution for traversing along the route from the current vehicle pose in a manner that satisfies the constraints and the user-specific value for the maximum rate of change for the acceleration of the vehicle; and
the user-specific value for the maximum rate of change for the acceleration of the vehicle influences a rate of vehicle movement resulting from the motion plan.

19. The system of claim 18, further comprising one or more sensors onboard the vehicle to provide sensor data, wherein:

the controller is configured to determine object prediction data for an object based at least in part on the sensor data and determines the motion plan based at least in part on the ride preference information, the current vehicle pose, the object prediction data and the constraints associated with the route; and the ride preference information influences the rate of vehicle movement relative to the object.

20. The system of claim 18, the ride preference information comprising a plurality of constraints, wherein the motion plan comprises an optimal solution for traversing along the route from the current vehicle pose that satisfies the plurality of constraints.

\* \* \* \* \*